July 28, 1964  S. M. LINDBLAD  3,142,103
SAFETY BELT BUCKLES
Filed March 5, 1962  4 Sheets-Sheet 1
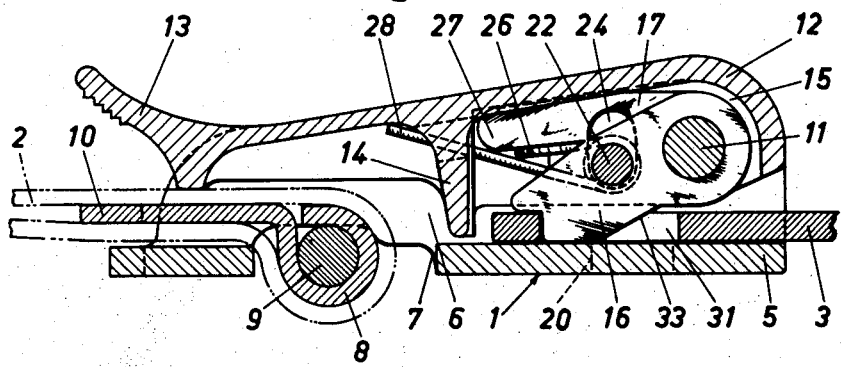
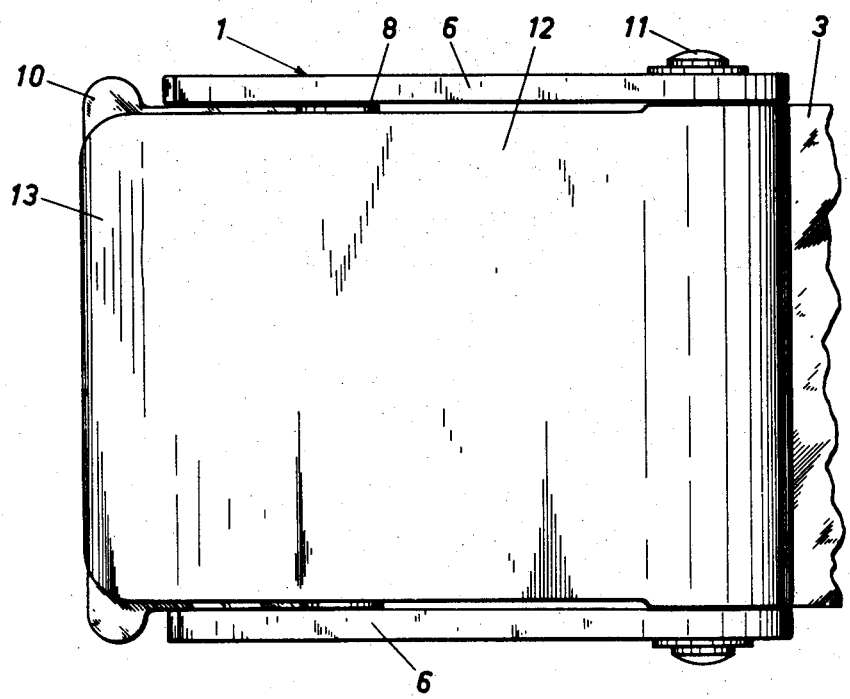
INVENTOR
STIG MARTIN LINDBLAD
BY
ATTORNEYS July 28, 1964

S. M. LINDBLAD 3,142,103

SAFETY BELT BUCKLES

Filed March 5, 1962

INVENTOR
STIG MARTIN LINDBLAD

BY *Linton and Linton*

ATTORNEYS

July 28, 1964  S. M. LINDBLAD  3,142,103
SAFETY BELT BUCKLES
Filed March 5, 1962  4 Sheets-Sheet 3
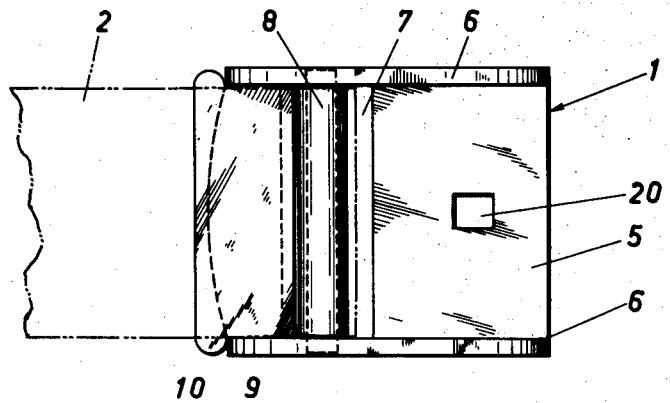
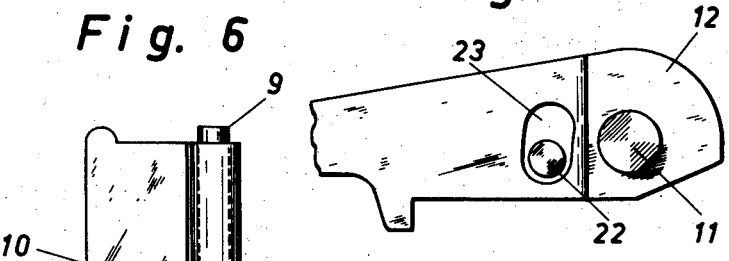
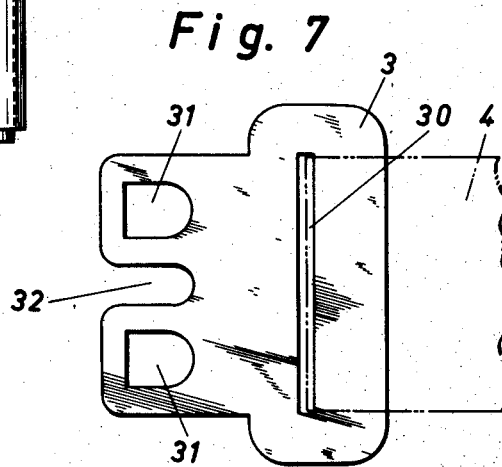
INVENTOR
STIG MARTIN LINDBLAD
BY
ATTORNEYS

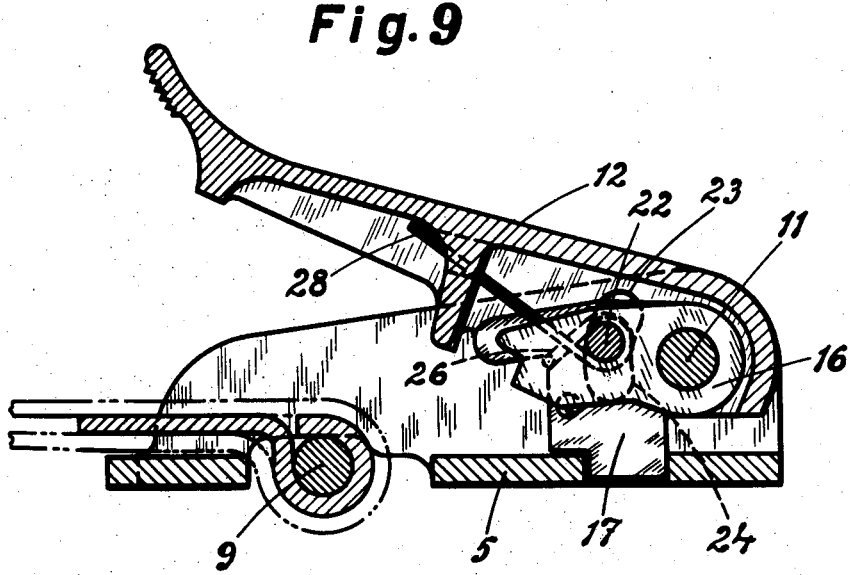

United States Patent Office 3,142,103
Patented July 28, 1964

3,142,103
SAFETY BELT BUCKLES
Stig Martin Lindblad, Vargarda, Sweden
Filed Mar. 5, 1962, Ser. No. 177,426
Claims priority, application Sweden Mar. 6, 1961
2 Claims. (Cl. 24—230)

The present invention relates to buckles, especially buckles for automobile safety belts and of the kind comprising two fastening members each connected to one end of a belt section. More specifically, the invention relates to buckles of this kind wherein one of said members is substantially plate-shaped and adapted to be inserted into the other member which is channel-shaped and provided with spring-loaded latch means for releasably retaining said plate-shaped member in said channel-shaped member, the latter also being provided with a handle member forming a cover for the open side of said channel member and which is pivoted at one end on a shaft extending between the side walls of the channel member, said handle member being adapted to be swung away from the bottom of said channel member against the action of a spring, thereby causing said plate-shaped member to be released.

The invention which has for its object to provide a reliable and easily operated buckle of the kind set forth above is mainly characterised in that said latch means comprises a number of pawls pivotally mounted on said shaft and adapted to engage in apertures in said plate-shaped member when said handle member is in its position covering said channel, means being provided for moving said pawls out of engagement with said apertures upon said handle member being swung upwardly.

According to the invention said pawls may be interconnected by means of a pin parallel to said shaft and having its end portions seated in slots provided in said handle member.

In one embodiment of the invention, slot-shaped recesses are formed in the lower side of said handle member for receiving those portions of the substantially plate-shaped pawls which are adjacent said shaft.

According to the invention there may further be provided a preferably plate-shaped member which is connected to said channel-shaped fastening member and disposed between said pawls and which is provided with a circular hole for said shaft, a slot for said pin, and two lateral projections extending in opposite directions therefrom, said projections adapted, when the fastening members are interconnected, to be situated adjacent that side of the plate-shaped fastening member which faces away from the bottom of the channel-shaped member.

The spring force acting against the upward swinging of the handle member as well as the spring force acting on the pawls may be obtained, according to the invention, from a wire spring having two coaxial, helically wound portions provided around said pin one on each side of the member provided with said lateral projections, a loop-shaped portion of said spring interconnecting said helical portions abutting against said member provided with said projections, and substantially straight, elongated end portions of said spring abutting against said handle member.

Said member provided with said lateral projections is preferably provided with a shoulder portion engaging in a recess in the bottom of the channel member.

The invention will be more fully described herebelow with reference to the accompanying drawings which illustrate one embodiment of the invention, and wherein:

FIG. 1 is a front view of the buckle with the two fastening members interconnected;

FIG. 2 is a longitudinal section through the buckle along the line II—II in FIG. 4;

FIG. 5 is a view to a smaller scale showing the channel-shaped member with the handle member removed;

FIG. 6 shows an adjustment roller for one part of the safety belt and drawn to the same scale as FIG. 5;

Figure 4:
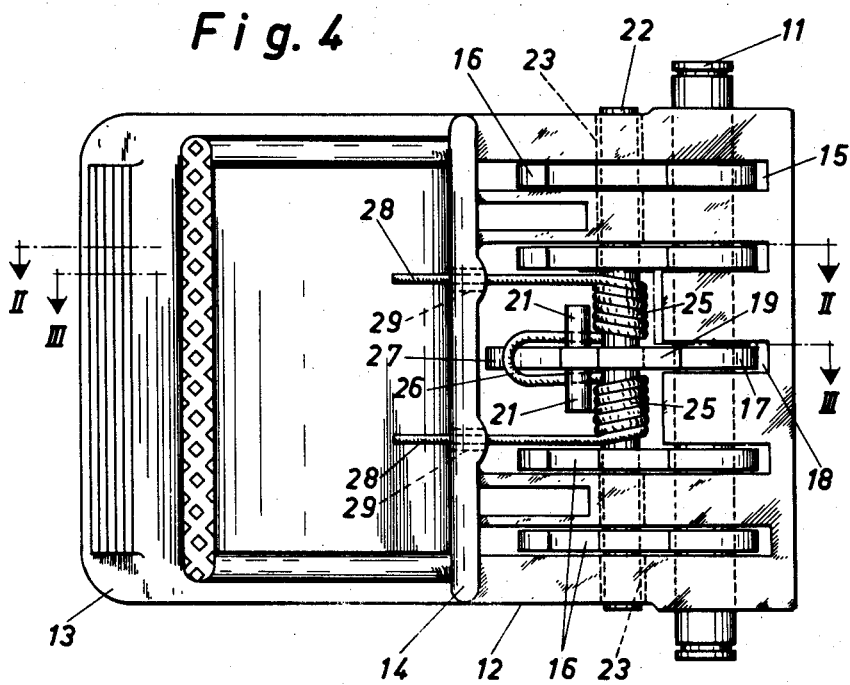
FIG. 4 is a view from the under side of the handle member which forms a cover for the channel-shaped member.

FIG. 7 which is also drawn to a smaller scale shows the plate-shaped fastening member;

FIG. 8 is a partly broken side view of the front portion of the handle member shown in FIG. 4; and FIGURE 9 is a longitudinal section through the buckle along the line IX—IX of FIG. 4, but with the buckle in its open fastening member releasing position.

Figure 3:
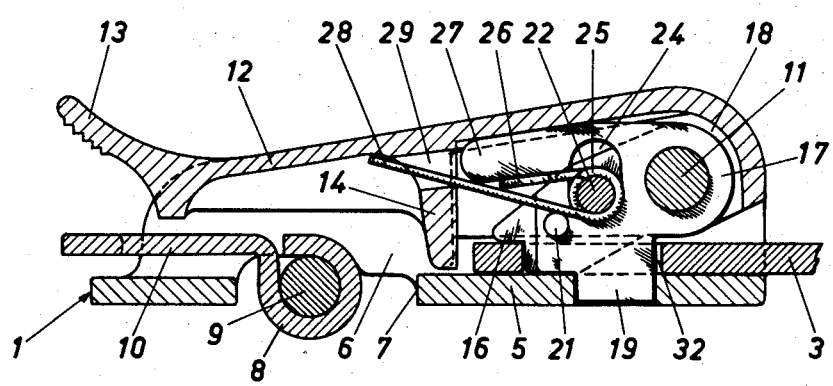
FIG. 3 is a longitudinal section taken on the line III—III in FIG. 4.

The buckle shown in the drawings comprises a channel-shaped fastening member 1 which is intended to be connected with one section 2 of a safety belt indicated in the drawings in double-dot-and-dash lines, and a plate-shaped fastening member 3 which is intended to be connected to the other section 4 of the safety belt (FIG. 7). The bottom 5 of the channel-shaped member 1 is provided, adjacent its rear end (the left end according to the drawings), with an opening 7 extending the whole width of the channel and partly into the side wall portions 6 of the channel-shaped member. In said opening there is provided an adjustment roller 8 formed by a portion of a plate 10, which portion is bent cylindrically around a pin 9, the flat portion of said plate 10 extending backwardly from said cylindrical portion over the bottom 5 of the channel-shaped member, as shown in FIGS. 2, 3 and 5. The belt section 2 is passed over the plate 10, around the adjustment roller 8 and back below the plate 10 between the latter and that portion of the channel bottom 5 which is situated behind the opening 7 (see FIG. 2).

The channel-shaped member 1 carries at its front end between the side walls 6 a shaft 11 on which there is journalled a handle member or cover 12 which is formed with a gripping portion 13 at the rear end.

In the embodiment shown, wherein the handle member is intended to be made of plastic material, the handle member is provided at its inner or lower side with a transverse wall 14 approximately midway between the front and rear edges of the handle member. That portion of the handle member which is situated between said wall and the front edge of the handle member comprises the means for detachably connecting the fastening member 3 to the channel-shaped member 1. As shown in FIG. 4, wherein the handle member is seen from the side facing the bottom of the channel-shaped member, the handle member is traversed by the shaft 11 in a thicker front portion of the handle member. In this thicker portion there are provided four slot 15 which are open towards the under side of the handle member and extend in parallel relation to each other and to the length of the handle member and each of which receives a plate-shaped pawl 16 which has one end journalled on the shaft 11. The pawls 16 are disposed two on each side of a plate-shaped member 17 which substantially coincides with the longitudinal middle plane of the handle member and which has a portion projecting into a slot-shaped recess 18 in the thicker portion of the handle member, the shaft 11 passing through an opening in said portion of the member 17. That edge of member 17 which faces away from the handle member is provided with a projection or shoulder 19 which engages in an opening 20 in the bottom 5 of the channel-shaped member. The member 17 is further provided with two lateral projections 21 extending in opposite directions and spaced from the channel bottom 5 a distance which is slightly larger than the thickness of the plate-shaped fastening member 3. The pawls 16 are interconnected by means of a pin 22 which passes through all of the pawls and which is disposed in parallel with and a distance from the pivot shaft 11, the end portions of the pin 22 being located in slots 23 (see FIG. 8) arranged in the handle member. The pin 22 further traverses a similar slot 24 in the central plate-shaped member 17. The slots 23 and 24 are elongated for the purpose of allowing pin 22 to move upwardly relative to the handle member 12 when the pawls 16, which are interconnected by means of pin 22, are swung upwardly upon insertion of the plate shaped member 3. The elongation of slot 24 also allows the pawls 16 to be swung upwardly by means of the handle member 12. On the pin 22 there is arranged a wire spring which has two coaxial, helically wound portions 25 with opposite winding directions situated one on each side of the member 17. The wound portions 25 are interconnected at their adjacent ends by a loop-shaped portion 26 which abuts against a shoulder 27 which is a portion of member 17 which in turn is immovably connected to the bottom 5 by means of the shoulder 19. The outer end portions 28 of the spring which are substantially straight extend through holes 29 in the transverse wall 14 of the handle member.

The plate-shaped fastening member 3 is provided adjacent one edge with a transverse slot 30 for the belt section 4 (see FIG. 7), and at its opposite end portion which is adapted for insertion into the channel-shaped member 1 the plate-shaped member is provided with two apertures 31 and a notch 32 located centrally therebetween, said notch being open towards the front edge (the left edge according to FIG. 7) of the fastening member. The pawls 16 which are situated two on each side of the central, plate-shaped member 17 in the handle member 12 are arranged with such spacing that two pawls will engage in each of the apertures 31 in the member 3 when the latter is inserted into the channel-shaped member 1. Each pawl 16 has a beveled edge 33 facing the front edge of the channel-shaped member.

When the plate-shaped member 3 is inserted into the channel-shaped member 1 the front edge of the plate-shaped member will engage said bevelled front edges of the pawls, thereby swinging said pawls around the shaft 11 away from the bottom 5 of the channel-shaped member against the action of the spring 25, 26, 28, whereafter the pawls will snap into the apertures 31 when the fastening member 3 has been moved to the position shown in FIGS. 2 and 3. In this position of the fastening member 3 the member 17 arranged in the handle member between the pairs of pawls will be situated in the notch 32 in the plate-shaped member. For releasing the plate-shaped fastening member 3 from the channel-shaped member, the handle member 12, by the aid of the gripping portion 13, is swung around the shaft 11 in a direction away from the bottom of the channel-shaped member, whereby the pin 22 passing through the pawls 16 will be brought along in the pivoting movement by the end walls of the slots 23 receiving the ends of pin 22, the pawls thereby being swung out of engagement with the apertures 31 in the plate member 3. The lateral projections 21 carried by the member 17 form a guide for the plate-shaped fastening member 3, so that the latter will be prevented from moving together with the pawls, thereby ensuring that member 3 will always remain in the position shown in FIGS. 2 and 3 immediately above the bottom of the channel-shaped member, so that the attachment members may be rapidly and easily separated from one another. Also the upward pivoting of the handle member takes place against the action of the spring placed around pin 22.

The spring arrangement described above, however, will have the effect that the spring force which has to be overcome for swinging the pawls 16 upon the plate 3 being inserted into the channel-shaped member 1 will be comparatively small, so that the fastening members may be interconnected very rapidly and easily, while the spring force which is to be overcome when the handle member is swung upwardly for releasing the plate 3 will be much greater, whereby unintentional opening of the buckle will be resisted. This action of the spring is due to the fact that during the first-mentioned pivoting movement of the pawls, whereat the handle member does not take part in the movement, a portion of the spring loop 26 will be wound up on the pin 22, while during the last-mentioned pivoting movement the spring is wound up from the ends as well as from the middle loop 26.

The invention is not limited to the embodiment which is described hereinbefore and shown in the drawings as an example only, said embodiment being susceptible of modifications with respect to its details without departing from the spirit of the invention.

What I claim is:

1. A safety belt buckle comprising a substantially plate-shaped fastening member and a channel-shaped fastening member each for being attached to a separate section of the belt, said channel-shaped member being adapted to receive said plate-shaped member, a shaft carried by and between the channel walls of said channel-shaped member, a handle member providing a cover for the open side of said channel-shaped member and pivotally mounted on said shaft, a plurality of pawls pivotally mounted on said shaft, said plate-shaped fastening member having apertures for receiving said pawls when said plate-shaped fastening member is received by said channel-shaped fastening member, a pin extending parallel to said shaft and interconnecting said pawls, said handle member having slots therethrough with said pin slideably mounted therein, a plate-shaped member positioned between said pawls having a circular opening with said shaft extending therethrough, a slot with said pin extending therethrough, and a shoulder, means interconnecting said plate-shaped member to said channel-shaped fastening member for preventing the pivoting of said plate-shaped member about said shaft, a wire spring having two coaxial, helically wound portions provided around said pin with said helical portions situated one on each side of said plate-shaped member, a loop-shaped portion of said spring interconnecting said helical portions and bearing against said plate-shaped member shoulder, said spring having substantially straight, elongated end portions and said handle member having openings with said spring ends therein tending to retain said handle member within said channel-shaped fastening member.

2. A safety belt buckle as claimed in claim 1 wherein said means interconnecting said plate-shaped member and said channel-shaped fastening member consists of a projection on said plate-shaped member and an opening in the channel-shaped member with said projection extending therein.

References Cited in the file of this patent

UNITED STATES PATENTS

| | | |
|---|---|---|
| 2,803,864 | Bishaf | Aug. 27, 1957 |
| 2,893,088 | Harper | July 7, 1959 |
| 2,896,284 | Bishaf | July 28, 1959 |